United States Patent [19]
Ferris

[11] 3,778,189

[45] Dec. 11, 1973

[54] ELASTOMERIC HELICOPTER ROTOR HEAD WITH DYNAMIC AND STATIC BLADE CONING AND DROOP STOPS

[75] Inventor: Donald L. Ferris, Newtown, Conn.

[73] Assignee: United Aircraft Corporation, East Hartford, Conn.

[22] Filed: Sept. 5, 1972

[21] Appl. No.: 286,509

[52] U.S. Cl................. 416/140, 416/134, 416/141
[51] Int. Cl. ........................................... B64c 27/38
[58] Field of Search................... 416/134, 140, 141, 416/106, 107

[56] References Cited
UNITED STATES PATENTS

| | | | |
|---|---|---|---|
| 3,310,119 | 3/1967 | Watson | 416/141 UX |
| 3,501,250 | 3/1970 | Mosinskis | 416/141 X |
| 3,533,713 | 10/1970 | Salmun | 416/140 |
| 3,556,673 | 1/1971 | Killian | 416/141 X |
| 3,591,310 | 7/1971 | Mouille | 416/141 X |
| 3,679,322 | 7/1972 | Mouille | 416/141 |
| 3,700,352 | 10/1972 | Gorndt | 416/141 X |

Primary Examiner—Everette A. Powell, Jr.
Attorney—Vernon F. Hauschild

[57] ABSTRACT

An elastomeric helicopter rotor having a blade mounted for universal motion about the intersection of the blade pitch change, flapping and lead-lag axes and including blade coning and droop stops, including a ring member rotatably mounted about the pitch change axis on the blade and coning and droop stops constituting segments of circular members whose centers lie on the blade lead-lag axes and with the ring member and coning stop and droop stop members presenting mating surfaces to one another so that as the blade moves in lead-lag motion while the blade ring member is in line or surface mating contact with either the coning stop surface or the static or dynamic droop stop surfaces, a relative rotation will be established therebetween for full support of the blade throughout the lead-lag motion, without affecting blade pitch angle or flapping angle, without preventing independent blade pitch change, and without scuffing of parts.

22 Claims, 8 Drawing Figures

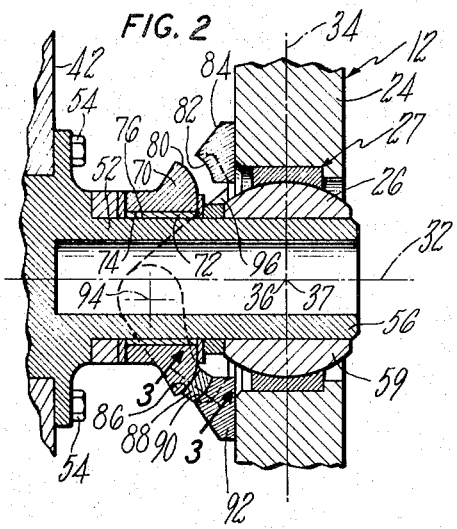
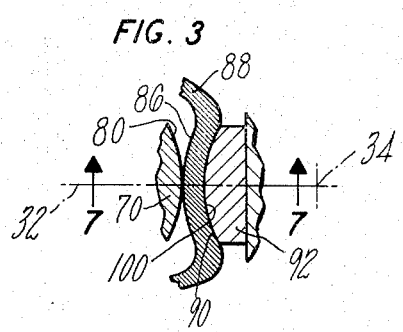
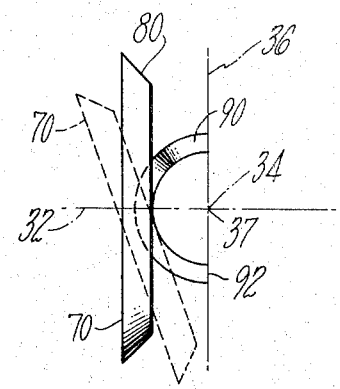
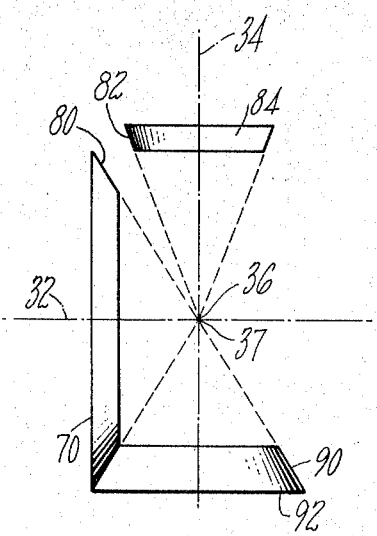

ELASTOMERIC HELICOPTER ROTOR HEAD WITH DYNAMIC AND STATIC BLADE CONING AND DROOP STOPS

CROSS-REFERENCE TO RELATED APPLICATION

Subject matter shown and described in this application is shown, described and claimed in a copending application Ser. No. 286,508 entitled "Elastomeric Helicopter Rotor Head with Dynamic and Static Blade Coning and Droop Stops" by Robert Rybicki filed on even date herewith.

BACKGROUND OF THE INVENTION

1. Field of the Invention

This invention relates to droop and coning limit stops for use in helicopter rotors and more particularly for use in such rotors in which the blade is mounted from the hub by mechanism, such as a spherical elastomeric bearing, for universal motion about the intersection of the blade pitch change, lead-lag and flapping axes. In particular, to such a droop stop and coning limit mechanism that rolling motion over mating abutting surfaces exists as the blade moves in lead-lag motion when the blade is in either limit position.

2. Description of the Prior Art

In the droop stop art, provisions have not been made for coning stop and droop stop means for a blade which is universally mounted, since blades have not been conventionally so mounted in the prior art articulated helicopter rotor art. In the past, articulated rotor blades have been mounted for motion about selected axes, as opposed to universal mounting about a point.

In the prior art, provisions have not been made for coning and droop limitations on a universally mounted blade for dynamic stops having a greater angular degree of freedom than the static angular degree of freedom.

In convention droop stop art, such as U.S. Pat. Nos. 2,614,640; 2,628,686; 2,719,593 and 2,906,348, there are no spherical, conical or rolling surfaces to accommodate the universal motion of a blade from a hub.

Kisovec U.S. Pat. No. 3,282,350 teaches droop and coning stops for use with elastomeric helicopter rotors, but these stops are of the flat pad design which do not provide the advantages of the construction taught herein. This patent does not provide constant coning or droop angle limitation throughout the lead-lag range, does not provide rolling contact between the blade and its limit stops, nor the ability to permit normal pitch change motion of the blade. When cone 60 of this patent is engaged, the blade is locked in pitch, lead-lag and flapping motion.

Mosinskis U.S. Pat. No. 3,501,250 teaches an articulated helicopter rotor with an elastomeric bearing mounting and with a droop stop, but of the flat pad and cylindrical roller variety. The cylindrical roller will skid, as opposed to producing rolling contact, since the roller must be conical to produce true rolling contact and the apex of the conical roller must be at the intersection of the lead-lag and flapping axes of the blade and such would not be the case in this patent even if the roller were considered to be conical. In addition, this patent does not include movable stops.

The disadvantage of the flat pad stops of the prior art is that flat pad designs are limited to satisfy one single specific degree of lead or lag at one particular degree of coning. Beyond this specific degree of lead or lag, contact of the stops results in a lesser degree of the required coning angle and high wear on the mating surface due to point or corner contact between the stop members. To satisfy two different degrees of angular droop, static and dynamic, the roller must be conical with its apex coincident with the center of the centering device, and the mating stop must also be conical, with its apex coincident with the center of the centering device. In addition, the mating stop surfaces must be concentric with the lead-lag axis in order to maintain an identical static and dynamic droop angle through all phases of lead-lag motion.

SUMMARY OF THE INVENTION

A primary object of the present invention is to provide a droop stop and a coning limit stop for a universally mounted helicopter blade in an articulated rotor wherein the blade is able to move in lead-lag motion without variation in droop or coning angle, either statically on the ground during starting or stopping operation or dynamically during flight operation where the angle of droop or coning is at a greater degree, providing full line or surface contact of the mating stops and without parts scuffing, without inducing pitch change motion, and while permitting independent blade pitch change motion, when the blade is at either its maximum limit coning angle or its maximum droop angle, by the use of coning limit and droop stops which are positioned to intercept and rotatably mate with a ring member mounted for rotation about the blade pitch change axis.

In accordance with the present invention, the mating surfaces of the blade mounted ring member and the coning and droop stop members are preferably conical with the apexes thereof intersecting the point of intersection of the blade pitch change, lead-lag and flapping axes, so that true rolling contact is achieved between these parts throughout the full lead-lag range of blade motion without part scuffing, but could be of the other shapes or curvatures disclosed herein in lightweight, light-load installations where pure rolling contact would not be absolutely essential.

In accordance with the present invention, when the blade is at either of its coning or flapping limit stops, lead-lag motion can take place without changing the angle of coning flapping.

In accordance with still a further object of the present invention, this permitted lead-lag motion at the limit stops occurs without scuffing between blade and hub mounted parts.

In accordance with a further aspect of the present invention, a centrifugally responsive mechanism is utilized with the dynamic droop stop to constitute a static droop stop when the blade is at low rotational speed operation or stopped.

In accordance with the teaching herein, the blade mounted rotatable ring member, the coning limit stop, the dynamic droop stop and the static droop stop preferably have conically selectively shaped surfaces whose apexes are positioned at the point of intersection of the blade pitch change, flapping and lead-lag axes, or mating spherical surfaces centered respectively on the blade pitch change and lead-lag axes. It may be considered that the coning limit stop and the dynamic and static droop stops are segmented mating spheres resulting in a matching, mating concave-convex surface.

It is a further object of this invention to utilize concave-convex mating surface contact between blade mounted and hub mounted droop and flap limit members, and corresponding surfaces on the centrifugally actuated stop member, to wedge the centrifugally actuated stop member in position to prevent its disengagement due to blade load when the helicopter is on the ground and the rotor is static.

Other objects and advantages of the present invention may be seen by referring to the following description and claims, read in conjunction with the accompanying drawings.

BRIEF DESCRIPTION OF THE DRAWINGS

FIG. 2 is an enlarged side view of the static and dynamic droop stop and coning limit stop.

FIG. 3 is a view taken along line 3—3 of FIG. 2.

FIG. 4 is a schematic top view representation of the coaction between the droop stop member and the blade mounted rotatable ring member of the FIG. 2 embodiment.

FIG. 5 is a side view of the construction shown in FIG. 4 and with flapping limit stop added.

DESCRIPTION OF THE PREFERRED EMBODIMENT

Figure 1:
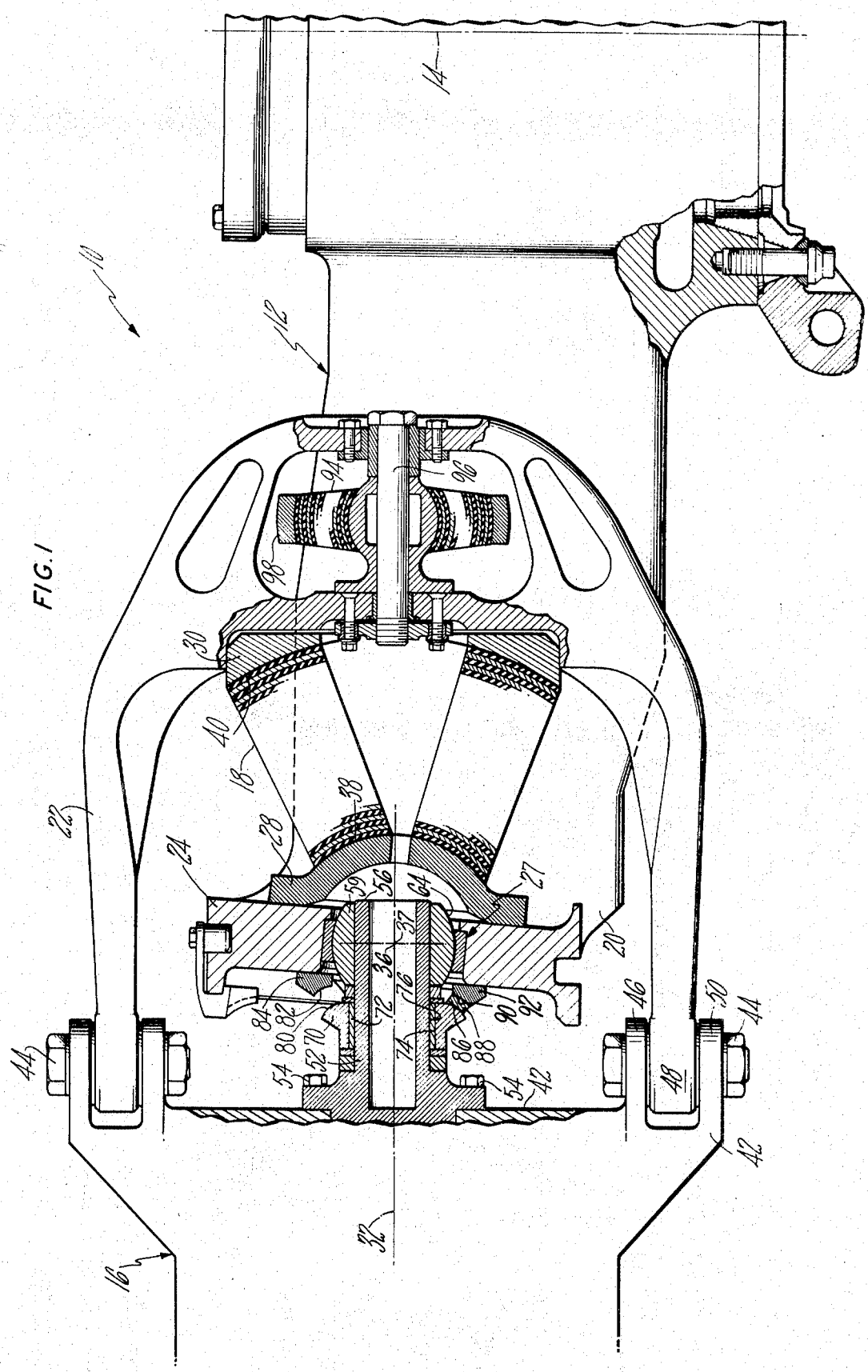
FIG. 1 is a partial side view of an articulated helicopter rotor, partially broken away for illustration, which shows the static and dynamic droop stop and coning limit stop in an environment of an articulated helicopter rotor in which the blade is supported from the rotor hub by a spherical elastomeric bearing so as to be universally movable about the intersection of the blade pitch change, lead-lag and flapping axes.

Referring to FIG. 1 we see articulated helicopter rotor 10 which comprises a rotor hub 12 mounted for rotation about axis of rotation 14. A plurality of blades, one of which is shown at 16, extends substantially radially from the hub and are mounted therefrom for rotation therewith about axis 14 to generate lift. Basically, the blade 16 is supported from hub 12 through spherical elastomeric bearing 18 or other suitable mechanism for universal motion. Bearing 18 is mountd between hub supported yoke or loop member 20 and blade connected yoke or loop member 22, which yoke members interlock to position elastomeric spherical bearing 18 therebetween. More specifically, hub arm 24 is a portion of hub link member 20 and serves to support blade centering bearing 26 and the inner race 28 of spherical bearing 18. The outer race 30 of spherical bearing 18 is connected to blade yoke 22 so that blade 16 is supported from hub 12 through spherical elastomeric bearing 18 for universal motion about the intersection 37 of pitch change axis 32, lead-lag axis 34 and flapping axis 36.

Elastomeric bearing 18 preferably includes spaced spherical metallic laminates encased in elastomer and spherically centered about intersection 37, as are surfaces 38 and 40 of the bearing races. The laminates are joined to one another with the outer elastomer joined to surface 40 and the inner elastomer to surface 38. Bonding is the preferred method of joining.

Blade sleeve 42 connects to blade yoke member 22 through conventional nut and bolt members 44, which extend through the aligned holes in the overlapping flanges thereof, such as those shown at 46, 48 and 50. Stub shaft 52, which is concentric about pitch change axis 32, is connected to sleeve 42 by conventional bolt members 54 and is preferably shaped to define centering pin 56. Centering pin 56 is also concentric about axis 32 and supports the inner race 59 of the spherical centering bearing 27, which is supported by hub arm 24 to be universally mounted about point 37. It will be noted that with this construction, blade 16 is mounted from hub 12 through spherical bearing 27 for universal motion about the intersection of the pitch change axis 32, the lead-lag axis 34 and the flapping axis 36 at common point 37.

Droop stop ring 70 is mounted for rotation about axis 32 on stub shaft 52 and is supported from the shaft by journal 72. Ring 70 is free to rotate with respect to stub shaft 52 because of the solid or dry lubricant or selective plating between ring surface 74 and journal surface 76. Surface 80 of ring 70 is of selected shape, to be described in greater particularity hereinafter, so that it will matingly engage surface 82 of coning limit stop member 84 when the blade is at its maximum permitted coning angle, and so that it will matingly engage surface 86 of static droop stop member 88 or surface 90 of dynamic droop stop 92. It is important that, when blade 16 is at its maximum coning and surface 80 is in contact with surface 82, the blade can move in lead-lag motion without scuffing of surfaces 80 and 82 and without inducing pitch change or decrease to the maximum coning angle, and while permitting independent blade pitch change motion. This is accomplished by having ring 70 rotate about pitch change axis 32 as it travels in rolling line contact along surface 82. The same is true, when surface 80 is in contact with surfaces 86 or 90 of the droop stops, so that blade 16 is permitted to move in lead-lag motion about axis 34 due to the rotation of ring 70 about axis 32 as it remains in rolling line contact with and rotates with respect to surfaces 86 or 90.

A conventional lead-lag damper, not shown but preferably of the conventional hydraulic cylinder-piston type, connects to blade yoke member 22 through damper bearing 94, which connects for universal motion about centering pin 96. Bearing outer race 98 is connected to the lead-lag damper.

Surfaces 82, 86 and 90 are shaped as segments of circular members which lie in a substantially horizontal plane and which circular members are centered on lead-lag axis 34. The cross-sectional shape of each is a circle segment concentric about lead-lag axis 34.

Dynamic droop stop member 92 and static droop stop member 88 will be described in greater particularity hereinafter.

By viewing FIG. 2, it will be noted that as blade 16 flaps or cones upwardly about flapping axis 36, surface 80 of rotatably mounted ring 70 will eventually bear against surface 82 of hub mounted coning angle limit member 84 to prevent a further increase in blade flapping motion. Surfaces 80 and 82 are selectively contoured to be in mating surface engagement as blade 16 moves in lead-lag motion about axis 34, while ring 70 and limit stop 84 continue in line rolling contact, and such occurs without scuffing, and without inducing pitch change and flapping angle change due to the rotation of member 70 with respect to member 84. Similarly, as blade 16 flaps downwardly during normal rotor operation, eventually surface 80 of ring 70 contacts surface 90 of dynamic droop stop 92 to prevent further downward flapping of blade 16. Again, surfaces 90 and 92 are selectively shaped so that they will be in mating line rolling engagement throughout as blade 16 moves in lead-lag motion about axis 34, with ring 70 rotating with respect to stop 92 to prevent pitch change, or flapping motion, or scuffing therebetween. In addition to dynamic droop stop 92, the FIG. 2 construction also includes static droop stop 88, which is substantially a U-shaped member pivotally connected at the ends of its legs at pivot points, such as 94, to bracket members 96, which are supported in conventional fashion from hub 12. Static droop stop 88 is shown in its low rpm or rotor-stopped position in FIG. 2 and it should be borne in mind, that, due to centrifugal force, as rotor rpm increases, static droop stop 88 will pivot about pivot point 94 in a clockwise direction so as to no longer be positioned between surfaces 80 and 90 of ring 70 and dynamic droop stop 92, respectively. As best shown in FIG. 3, static droop stop 88 includes surface 86 which matingly engages surface 80 of ring 70 when static droop stop 88 is in its FIG. 2 position. Surface 86 is also selectively shaped to matingly engage surface 80 of ring 70 at all times as blade 16 leads and lags about lead-lag axis 34, while ring 70 rotates with respect to static stop 88. It will also be noted that static stop 88 includes surface 100, which corresponds in shape to surface 90 of dynamic droop stop 92 for clearance purposes anu full surface contact so as to allow static droop member 88 to overlap stop 92.

Surfaces 80, 82, 86 and 90 can be of different shapes as shown in FIGS. 4-6, but it should be borne in mind that it is important that surfaces 82, 86 and 90 matingly engage surface 80 of rotatable ring 70 in mating line contact to lend full support thereto and remain in mating engagement as blade 16 moves in lead-lag motion while these surfaces are in contact, with ring 70 rotating with respect to surfaces 82, 86 or 90 to prevent metallic scuffing, blade pitch or lag angle change, and to allow independent blade pitch change motion within ring 70.

It should be borne in mind that line contact between mating parts is preferable to point contact from a wear standpoint and permits the rolling feature between the parts so abutting.

As best shown in FIGS. 4 and 5, surfaces 80 and 90 of rotatable ring 70 and dynamic droop stop 92, respectively, are shown as frustoconical in shape and as being portions of cones whose apexes intersect at the point of intersection 37 of axes 32, 34 and 36. This is best shown in FIG. 5. As best shown in FIG. 4, while frustoconical surfaces 80 and 90 of ring 70 and dynamic droop stop 92 are in continuous line rolling contact, ring 80 may rotate with respect to stop 92 as blade 16 moves in lead-lag motion about axis 34. This relative rotation occurs without changing the blade droop or flapping or pitch angle. FIG. 4 shows ring 70 in two positions, in the solid line nonlag position and in the phantom lead or lag position. It will be noted by viewing FIGS. 4 and 5 that dynamic droop stop surface 90 is at least a segment of a conical member lying horizontally or in a plane parallel to pitch change axis 32 and concentric about lead-lag axis 34.

As best shown in FIG. 5, flapping stop limit member 84 is also at least a segment of a cone lying in a horizontal plane or in a plane parallel to pitch change axis 32 and concentric about lead-lag axis 34 and presents frustoconical surface 82 for contact with surface 80 of ring 70, which frustoconical surface 82 is formed from a cone whose apex is at the aforementioned point of intersection 37 between axes 32, 34 and 36. The advantage to be gained by the FIG. 4 and 5 construction in which surfaces 82 and 90, and surface 86 of FIG. 3, are frustoconical with apexes positioned at point of intersection 37 and concentric about axis 34 and surface 80 of ring member 70 is also frustoconical with apex positioned at point of intersection 37 and concentric about leadlag axis 32, when centered, is that pure, rolling, line contact occurs continuously between surfaces 80 and 90 or 80 and 82, respectively, when blade is in its droop limit or flap limit position and moving in lead-lag motion without inducing blade pitch change and without scuffing of mating parts. This is my preferred embodiment.

As best shown in FIG. 4a, surface 80 of rotatable ring 70 can be of spherical shape centered about a point 101 on pitch change axis 32 of radius R and, dynamic droop stop surface 90 is of equal or corresponding radius R about point 101 when the surfaces contact, and are shaped to be a ring segment concentric about axis 34. Surface 82 of coning limit stop 84 is a concave surface corresponding in shape to spherical surface 80 and is accordingly of radius R when point 101 moves with pitch change axis 32 about point of intersection 37 or flapping axis 36 so that surfaces 80 and 82 are in contact. If a static droop stop 88 were being used with the FIG. 6a construction, its mating surface 86 would also be concave at radius R about point 101 when surfaces 80 and 86 were in contact. Surface 86 would also be concentric about lead-lag axis 34.

Figure 6A:
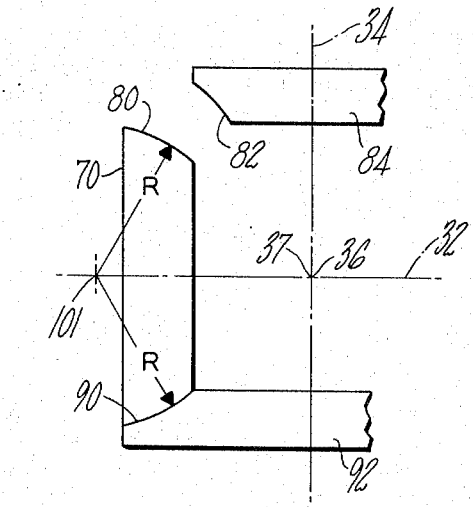
FIGS. 6a and 6b are side views of modifications showing concave-convex contact surfaces between the droop stop member, the flapping limit stop member and the blade mounted rotatable ring member of the FIG. 2 embodiment.
Figure 6B:
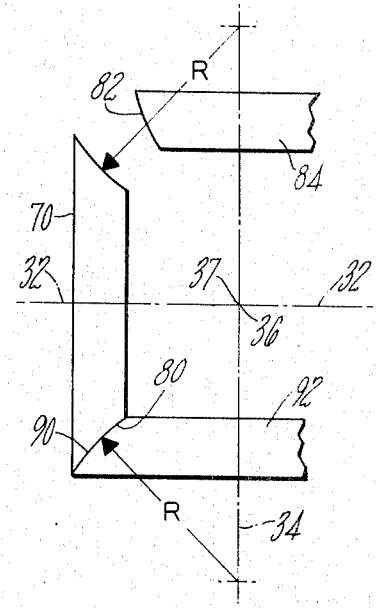

FIG. 6b illustrates that the curvature of surfaces 90, 80 and 82 can be at radius R centered above lead-lag axis 34.

Figure 7:
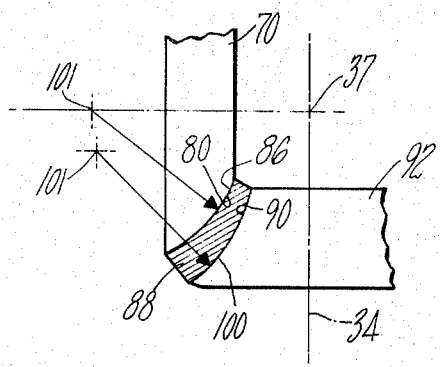
FIG. 7 is a section along line 7—7 of FIG. 3 for the modification where the contacting surfaces are spherical.

The advantage to be gained by the FIG. 6a-6b constructions is that, as best shown in FIG. 7, the static droop stop member 88 is shaped to be locked in wedged position between members 70 and 92 when the blade is at rest so that the weight of the blade does not cause static droop stop member 88 to be forced out of position from between members 70 and 92.

It will accordingly be seen that with or without the flapping limit member 84 of FIG. 1, blade 16 may droop downwardly until surface 80 of rotatable ring 70 contacts either mating surface 86 or 90 of static or dynamic droop stops 88 and 92, respectively, and blade 16 can move freely in lead-lag motion without affecting blade pitch, while permitting blade pitch change, and while permitting the maximum droop angle to remain constant, and without scuffing between the surfaces in contact, all due to the continuous line contact and rolling motion which exists between surface 80 of ring 70 and the corresponding mating surface 82 of flap limit stop 84 or surfaces 86 or 90 of droop stops 88 or 92. Blade 16 can move freely in lead-lag motion about axis 34 without affecting blade pitch, while permitting blade pitch change independently of blade lead-lag motion, and while permitting the upward flapping or lower drooping blade angle to remain constant, and without scuffing between the surfaces in contact, all due to the continuous contact and rolling motion which exists between surfaces 80 of ring 70 and the corresponding mating surface 82 of flap limit stop 84 or surfaces 86 or 90 of droop stops 88 or 92.

I wish it to be understood that I do not desire to be limited to the exact details of construction shown and described, for obvious modifications will occur to a person skilled in the art.

I claim:
1. An articulated helicopter rotor including:
   A. a rotor hub adapted to be mounted for rotation,
   B. at least one helicopter blade projecting substantially radially from said hub and having a pitch change axis, a lead-lag axis, and a flapping axis intersecting at a common point,
   C. means supporting said blade from said hub for universal motion about the intersection of said axes,
   D. a ring member mounted on said blade for rotation relative thereto about said pitch change axis and at a station radially outward of said point of intersection and having:
      1. a selectively shaped surface positioned to move toward said hub as said droops downwardly,
   E. a droop stop member connected to said hub and having a selectively shaped surface positioned to intercepting said ring member when said blade droops downwardly to a first selected angle and which surface is shaped to present a corresponding mating surface with said ring member surface to effect relative rotation therebetween as said blade moves in lead-lag motion when said surfaces are in contact.

2. A rotor according to claim 1 wherein said droop stop member surface is conical with the apex thereof located at said point intersection of said axes.

3. A rotor according to claim 1 wherein the mating surfaces of said droop stop member and said ring member are concave-convex for mating engagement.

4. A rotor according to claim 1 wherein selectively shaped surfaces of said ring member and droop stop member are frustoconical with the apexes thereof positioned at said point of intersection.

5. A rotor according to claim 1 and including a centrifugally responsive member having a first selectively shaped surface corresponding to said selectively shaped surface of said ring member and a second selectively shaped surface corresponding to said selectively shaped surface of said droop stop member and being pivotally mounted with respect to said blade and hub for motion between a first position wherein said pivotally mounted member is positioned between the selectively shaped surfaces of said ring member and said droop stop member at low rotor speeds or when the rotor is stopped and oriented so as to present its first selectively shaped surface to said selectively shaped surface of said ring member for mating engagement therewith and to present its second selectively shaped surface of said droop stop member for mating engagement therewith when said blade droops downwardly beyond a second selected angle, and a second position remote from said ring member and said droop stop member.

6. A rotor according to claim 5 wherein said droop stop member is wedge shaped between said first and second selectively shaped surfaces so that said droop stop member is locked in position between said ring member and said droop stop member when in said first position.

7. A rotor according to claim 6 wherein said selectively shaped surfaces of said droop stop member, said ring member and said centrifugally responsive member are arcuate with said first selectively shaped surface of said centrifugally responsive member shaped to be in mating engagement with and corresponding to said selectively shaped surface of said ring member and with said second selectively shaped surface of said centrifugally responsive member shaped to be in mating engagement with and corresponding to said selectively surface of said droop stop member when said centrifugal responsive member is in said first position.

8. A rotor according to claim 5 wherein said selectively shaped surfaces of said ring member and said droop stop member and said selectively shaped surfaces of said centrifugally responsive member are shaped so that concave convex mating occurs between said first selectively shaped surface of said centrifugally responsive member and said ring member and between said second selectively shaped surface of said centrifugally responsive member and said droop stop member when said centrifugally responsive member is in said first position.

9. A rotor according to claim 8 wherein said centrifugally responsive member is of wedge-shaped cross section between said first and second selectively shaped surfaces thereof so that said centrifugally actuated member is locked in said first position when its first and second selectively shaped surfaces, respectively, matingly engage the selectively shaped surfaces of said ring member and said droop stop member.

10. A rotor according to claim 5 wherein said second selected angle is less than said first selected angle.

11. A rotor according to claim 1 wherein said support means includes a spherical elastomeric bearing centered about said point of intersection and having alternate elastomeric and rigid laminates.

12. A rotor according to claim 1 wherein said droop stop member is a circular segment which lies in a substantially horizontal plane and the center of which lies on the lead-lag axis.

13. A rotor according to claim 1 and including a coning limit stop member connected to said hub and having a selectively shaped surface positioned to intercept said ring member when said blade flaps or cones upwardly to a selected angle and which surface is shaped to present a corresponding mating surface with said ring member surface to effect relative rotation therebetween as said blade moves in lead-lag motion when said surfaces are in contact.

14. A rotor according to claim 13 wherein said coning limit member is a circular segment which lies in a substantially horizontal plane, the center of which lies on said lead-lag axis.

15. A rotor according to claim 1 wherein said selectively shaped surface of said ring member and said selectively shaped surface of said droop stop member are frustoconical with apexes positioned at said point of intersection and concentric about said pitch change axis and said lead-lag axis, respectively, and which are shaped to form line contact when said selectively shaped surfaces abut and rotate relative to one another.

16. A rotor according to claim 1 wherein said selectively shaped surface of said ring member and said selectively shaped surface of said droop stop member are shaped to be spherical about either a point on the pitch change axis or a point on the lead-lag axis so as to be in line contact when said surfaces engage and rotate relative to one another.

17. A rotor according to claim 5 wherein said selectively shaped surfaces of said ring member, said droop stop member and said centrifugally responsive member are frustoconical with apexes located at said point of intersection of said pitch change, lead-lag and flapping axes and wherein said selectively shaped surfaces of said droop stop member and said centrifugally responsive member are concentric about said lead-lag axis and said selectively shaped surface of said ring member is concentric about said pitch change axis so that said blade may move in lead-lag motion and at constant droop angle and without altering blade pitch as said ring member and said droop stop member rotate relative to each other as said selectively shaped surfaces thereof are in continuous engagement.

18. A rotor according to claim 15 and including a coning limit stop member connected to said hub and having a selectively shaped surface which is frustoconical with its apex positioned at said point of intersection and concentric about lead-lag axis, and which is shaped to form line contact when said selectively shaped surfaces of said ring member and said coning angle limit member rotate relative to one another while in continuous contact and with said blade at constant flapping angle.

19. A rotor according to claim 16 and including a coning angle limit stop member connected to said hub and having a selectively shaped surface which is spherical about a point on the lead-lag axis or the pitch change axis and which corresponds in curvature with said selectively shaped surface of said ring member and is positioned to contact said selectively shaped surface of said ring member when said blade coning angle reaches a selected maximum so as to be in line contact when said selectively shaped surface of said ring member and said coning angle limit stop member engage and rotate relative to one another.

20. A rotor according to claim 5 wherein said selectively shaped surfaces of said ring member, said droop stop member, and said centrifugally responsive member are spherical about points located on said pitch change axis or said lead-lag axis and of common radius and wherein said selectively shaped surfaces of said droop stop member and said centrifugally responsive member are concentric about said lead-lag axis, and said selectively shaped surface of said ring member is concentric about said pitch change axis.

21. An articulated helicopter rotor including:
A. a rotor hub adapted to be mounted for rotation,
B. at least one helicopter blade projecting substantially radially from said hub and having a pitch change axis, a lead-lag axis and a flapping axis intersecting at a common point,
C. means supporting said blade from said hub for universal motion about the intersection of said axes,
D. a ring member mounted on said blade for rotation relative thereto about said pitch change axis and at a station radially outward of said point of intersection and having:
 1. a selectively shape surface positioned to move toward said hub as said blade droops downwardly, wherein said selectively shaped surface is frustoconical concentrically about the pitch change axis and having an apex at said common point,
E. a droop stop member connected to said hub and having a selectively shaped surface positioned to intercept said ring member selectively shaped surface when said blade droops downwardly to a first selected angle and which surface is frusto-conical concentrically about said lead-lag axis and having an apex positioned at said common point so that with said frustoconical surfaces in continuous line contact, said blade may move in lead-lag motion at constant droop angle and without affecting blade pitch, while said ring member rolls relative to said droop stop member without part scuffing.

22. A rotor according to claim 21 wherein said selectively shaped surfaces of said ring member and said droop stop member are segmented spheres concentric about said pitch change axis or said lead-lag axis.

* * * * *